United States Patent
Volentine et al.

(10) Patent No.: US 6,363,473 B1
(45) Date of Patent: Mar. 26, 2002

(54) SIMULATED MEMORY STACK IN A STACKLESS ENVIRONMENT

(75) Inventors: Robert J. Volentine; Rahul G. Patel, both of Houston, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/283,994

(22) Filed: Apr. 1, 1999

(51) Int. Cl.[7] .................. G06F 12/06; G06F 12/08; G06F 9/32; G06F 9/42
(52) U.S. Cl. ............... 712/202; 712/245; 711/132; 711/125; 711/208; 711/209; 711/219
(58) Field of Search ..................... 712/202, 220, 712/228, 241, 230, 242, 227, 243, 244, 245, 268; 710/264, 261, 245; 711/219, 125, 108, 144, 118, 132, 209, 123; 708/205; 707/103, 206; 714/2, 48, 704

(56) References Cited

U.S. PATENT DOCUMENTS

| | | | | |
|---|---|---|---|---|
| 5,220,669 A | * | 6/1993 | Baum et al. | 709/108 |
| 5,261,101 A | * | 11/1993 | Fenwick | 712/202 |
| 5,604,877 A | * | 2/1997 | Hoyt et al. | 712/243 |
| 5,732,272 A | * | 3/1998 | Gochee | 395/704 |
| 6,212,630 B1 | * | 4/2001 | Takayama et al. | 712/202 |

* cited by examiner

Primary Examiner—Daniel H. Pan
(74) Attorney, Agent, or Firm—Conley, Rose & Tayon P.C.; Michael F. Heim; Jonathan M. Harris

(57) ABSTRACT

A computer system that simulates a memory stack in a non-general purpose register set in the computer's CPU. The computer system can use the simulated memory stack to store a return address before jumping to a subroutine or use the simulated stack to store a data value for subsequent retrieval and use. The non-general purpose register set may include memory type range registers (MTRRs). One of the MTRRs is designated as the stack pointer register and is used to store a pointer index value which identifies which of the other MTRR registers is associated with the top of the simulated memory stack. The computer system preferably includes a non-volatile memory, such as a ROM, which contains executable instructions for implementing the simulated memory stack. The instructions provide for incrementing and decrementing the pointer index value and writing to and reading from the MTRR registers identified by the pointer index as associated with the top of simulated stack. By using non-general purpose registers to store data and return addresses, more general purpose registers are available for other reasons. The computer system advantageously permits the simulation of a conventional memory stack when main memory is not available to provide the conventional memory stack.

42 Claims, 6 Drawing Sheets

FIG.5
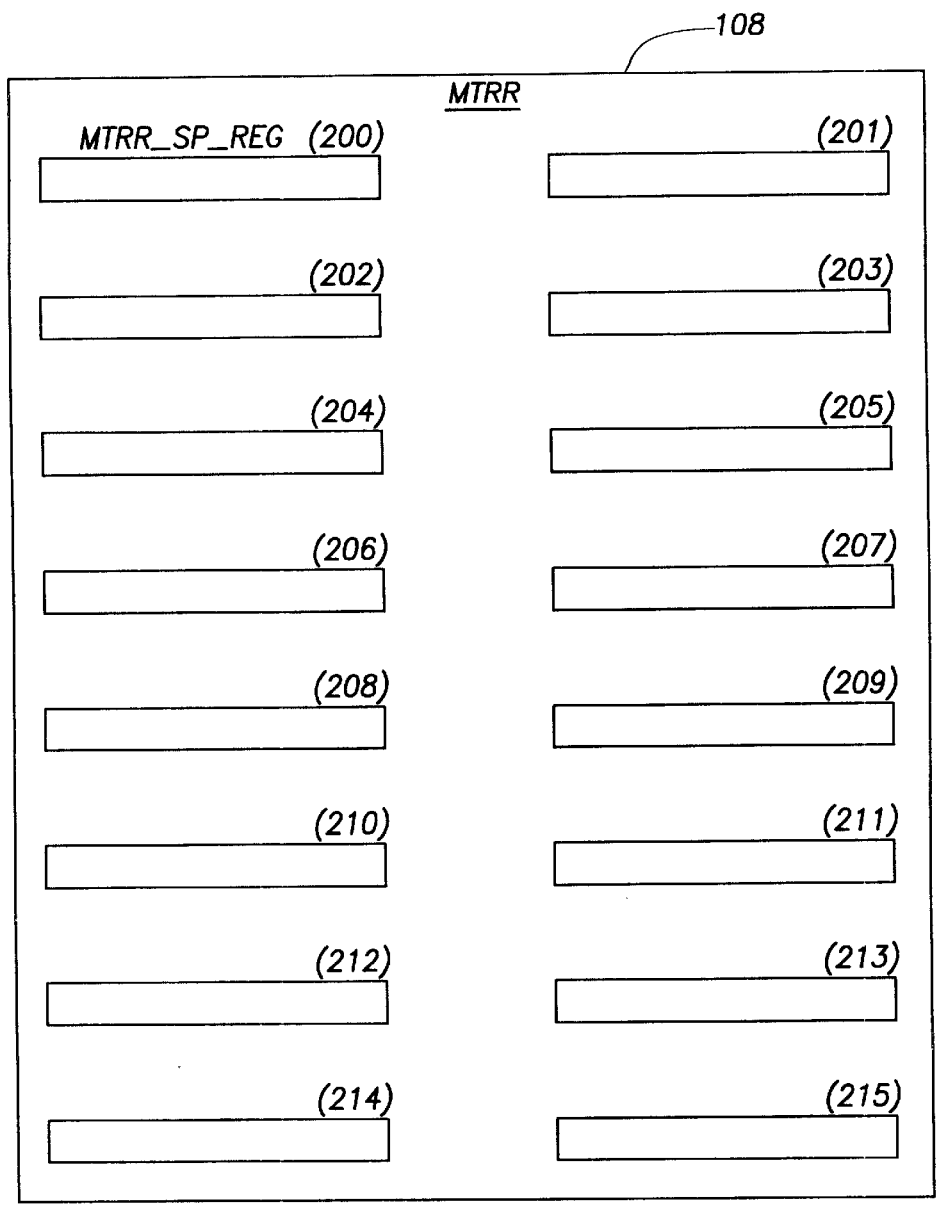
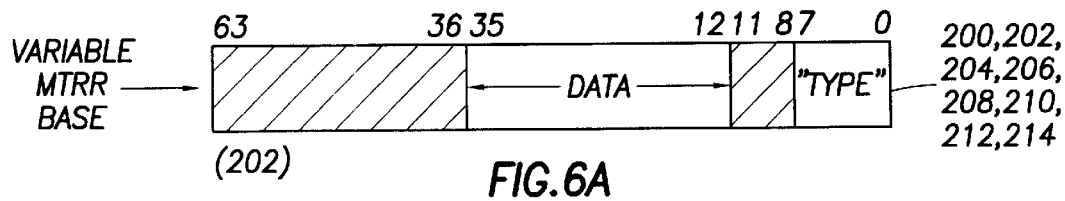
FIG.6A
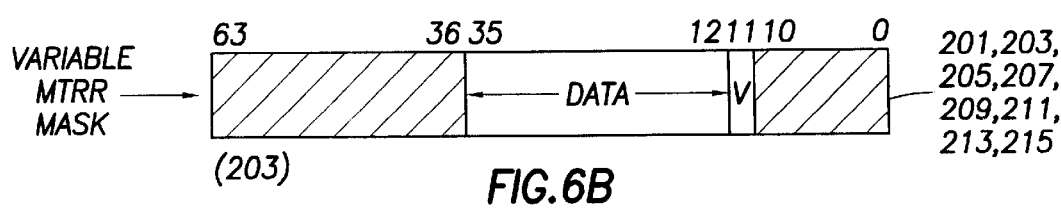
FIG.6B

SIMULATED MEMORY STACK IN A STACKLESS ENVIRONMENT

CROSS-REFERENCE TO RELATED APPLICATIONS

Not applicable.

STATEMENT REGARDING FEDERALLY SPONSORED RESEARCH OR DEVELOPMENT

Not applicable.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever

BACKGROUND OF THE INVENTION

1. Field of the Invention

The present invention generally relates to initializing a computer system. More particularly, the invention relates to simulating a "memory stack" particularly when system memory is not yet available during the initialization process. More particularly still, the invention relates to the use of non-general purpose registers within a microprocessor to simulate a memory stack.

2. Background of the Invention

Each time a personal computer system is turned on, or "re-booted" if already powered on, an initialization process is performed. During initialization, memory is tested and various other system components are tested and initialized. This initialization process is often referred to as the Power On Self Test ("POST"). The present invention is particularly useful during a phase of POST, although it is not limited just to the POST environment. To fully appreciate the benefits of the present invention, an understanding of a conventional computer system may be helpful.

A conventional computer system configuration is shown in FIG. 1. A central processing unit (CPU) 20, which typically includes a set of general purpose registers 22, usually couples to system memory 25 through a primary bridge and memory controller unit 30. The primary bridge and memory controller unit 30 also provides a connection to various peripheral devices (one is shown in FIG. 1) and a secondary bridge unit 35 by way of a primary peripheral bus. A non-volatile memory device 40 couples to the secondary bridge 35 through a secondary peripheral bus.

The non-volatile memory device 40 shown in FIG. 1 typically is implemented as read only memory (ROM) and contains the computer's basic input/output system (BIOS) code. The BIOS code includes instructions that are executed by the CPU 20 to perform POST. During initialization, the CPU thus retrieves and executes POST instructions from the BIOS ROM 40 to test and initialize the computer system. The BIOS code also includes routines that are executed during normal system operation to control and access various input and output devices such as a keyboard, a floppy drive and a mouse.

One of the steps performed during POST involves testing and initializing the memory subsystem. The memory subsystem generally includes the system memory 25 and memory controller logic typically implemented as part of the primary bridge and memory controller logic 30. In most conventional computer systems available today, many devices in the computer, such as the CPU 20, can request access to the system memory 25. Because many system devices can concurrently request access to system memory 25, but only one access request generally can be processed by the memory 25 at any one point in time, a memory controller is necessary to control access to memory. The memory controller usually includes arbitration logic to determine which one request out of multiple pending memory requests will be serviced.

System memory 25 generally provides temporary "scratchpad" storage for data, BIOS code addresses, configuration parameters and other types of information. During initialization, the CPU 20 may store data temporarily in system memory 25 for later use in completing the initialization. Another use of system memory 25 is illustrated in FIG. 2 which shows four subroutines 50, 52, 54, and 56 that may be BIOS subroutines executed during initialization. As shown, program control can jump from one subroutine to another. For example, while executing subroutine 50, the CPU jumps to address X which begins subroutine 52. Once the CPU completes executing subroutine 52, control jumps back to subroutine 50 at return address RTNX. While executing subroutine 52, however, the CPU may also jump to address Y which begins subroutine 54. Before returning to return address RTNY at the completion of subroutine 54, the CPU may also jump to subroutine 56. After completing subroutine 56, the CPU jumps back to subroutine 54 at return address RTNZ. Thus, when program control passes to another subroutine, control must eventually return to the next sequential address following the jump instruction which initiated the change in program control.

To properly execute the subroutines, the CPU must keep track of the order in which the 20 subroutines were executed so that the CPU will return to the appropriate subroutine. The CPU generally keeps track of the order by temporarily storing the return address (RTNX, RTNY, and RTNZ in the example of FIG. 2). System memory 25 provides convenient temporary storage into which the CPU can store the return addresses. The CPU then can retrieve each return address when it is ready to jump back to a previous subroutine.

A portion of system memory 25 can be configured as a "stack." A memory stack typically is a set of contiguous memory locations and includes a "pointer" which keeps track of the memory location in the stack with the highest memory address. That location is referred to as the "top" of the stack. Each new value, such as a return address or datum, that is stored in the stack, is placed on the top of the stack. The process of storing a new value on the stack usually is referred to as "pushing" the value on the top of the stack. The reverse process by which the value on the top of the stack is retrieved is referred to as "popping" the value off the stack. Each time a value is pushed onto the stack, the pointer is incremented to point to the new top of stack memory location. Each time a value is popped off the stack, the pointer is decremented. As such, the current top of stack pointer value changes each time values are pushed on or popped off the stack. Data values pushed onto the stack in a particular order must be retrieved in the reverse order; that is, only the value that is stored at the current top of stack memory location can be popped off the stack.

One of the steps to be performed in initializing the memory subsystem is to test and initialize the memory controller. Until the memory controller is initialized, system memory 25 is unavailable to the rest of the computer system.

As such, memory stacks cannot be configured and used until the memory controller has been initialized. The period of time during POST in which memory stacks are unavailable is referred to as a "stackless environment." Alternative techniques are necessary to keep track of subroutine return addresses and to provide temporary storage of data values.

One simplistic technique is for the return addresses to be "hard-coded" into the subroutine instructions. Using this technique, when the CPU 20 completes execution of a subroutine, control always passes to a predetermined address. This technique avoids the need to temporarily store the return addresses. This technique, however, is problematic if it is desirable to call a particular subroutine from two or more other routines. There is no mechanism to keep track of which of the two routines has called the subroutine.

Another technique has been implemented in which the return addresses are stored in the general purpose registers 22 implemented in the CPU 20 (FIG. 1). Once a return address is stored in a particular general purpose register, that particular return address subsequently can be retrieved from the register. It is important not to change contents of a general purpose register that includes a subroutine return address until the return address is retrieved. Otherwise, program control will be disrupted.

A CPU, however, only has a limited number of general purpose registers. As their name suggests, general purpose registers can be used, and typically are used, for a variety of purposes besides temporary storage of subroutine return addresses. Often, it is desirable to temporarily store a particular data value while other steps or calculations are performed by a routine. It may be desirable, for example, to temporarily store the configuration of a computer device or subsystem. Once the present configuration is saved, the CPU can change the configuration of the device or subsystem, perform a desired step, and reconfigure the device or subsystem using the previous configuration retrieved from the general purpose register.

With only a limited number of general purpose registers available in the CPU, but numerous potential uses of the registers, using the registers to store subroutine return addresses reduces the number of general purpose registers available for other uses. In the example of FIG. 2, the CPU must store three return addresses, RTNX, RTNY, and RTNZ in the general purpose registers 22. The registers that contain these three return addresses cannot be used for other purposes unit the addresses are retrieved for use. The CPU's general purpose registers 22 represent the primary storage capability of conventional computer systems during system POST in a stackless environment.

Thus, a computer system that can make more efficient use of the CPU's general purpose registers is needed. Such a computer system should be able to provide adequate storage for subroutine return addresses and data without compromising the availability of the CPU general purpose registers.

BRIEF SUMMARY OF THE INVENTION

The deficiencies of the prior art described above are solved in large part by a computer system that simulates a memory stack in a non-general purpose register set preferably in the computer's CPU. The computer system can use the simulated memory stack to store a return address before jumping to a subroutine or use it to store a data value for subsequent retrieval and use.

The non-general purpose register set may include memory type range registers (MTRRs) typical of certain CPU's. One of the MTRRs is designated as the stack pointer register and is used to store a pointer index value which identifies which of the other MTRR registers is associated with the top of the simulated memory stack. The computer system preferably includes a non-volatile memory, such as a ROM, which contains executable instructions for implementing the simulated memory stack. The instructions include instructions for incrementing and decrementing the pointer index value and writing to and reading from the MTRR registers identified by the pointer index as associated with the top of the simulated stack.

By simulating a memory stack in non-general purpose registers, the problems described above regarding the limited availability of general purpose registers are mitigated or avoided altogether. By using non-general purpose registers to store data and return addresses, more general purpose registers are available for other uses. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiments is considered in conjunction with the following drawings, in which:

FIG. 5 shows the MTRR's that are used in accordance with the preferred embodiment to implement a simulated memory stack;

FIGS. 6A and 6B shows the bit representations of an MTRR register pair as implemented in the preferred embodiment of the invention;

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 3:
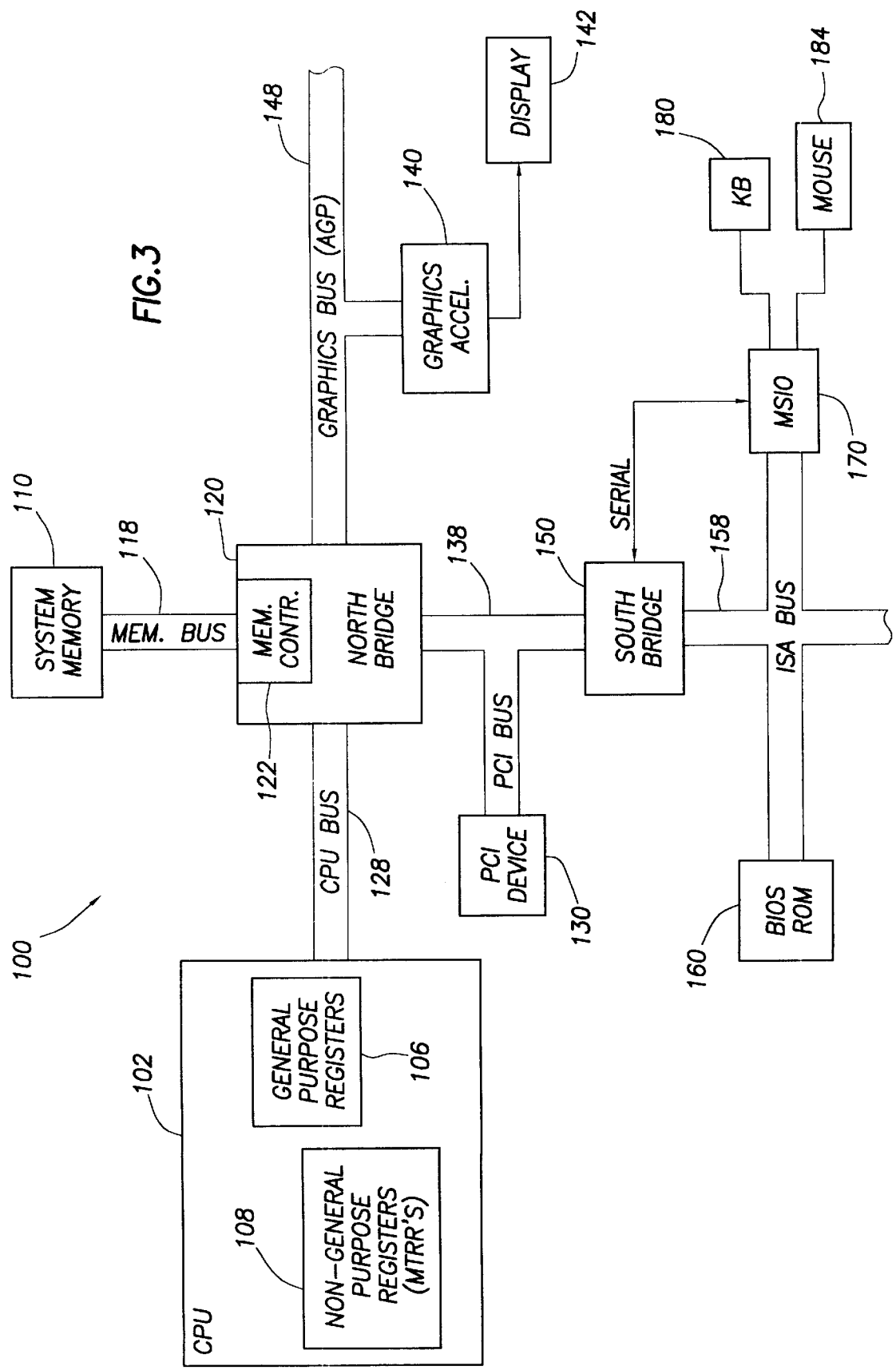
FIG. 3 is a block diagram of computer system configured in accordance with the preferred embodiment of the invention and including a CPU having general purpose registers 20 and non-general purpose registers, preferably memory type range registers (MTRR's), that are used to simulate a memory stack in a stackless environment.

Referring now to FIG. 3, a computer system 100 constructed in accordance with the preferred embodiment generally includes a processor or CPU 102 coupled to a main system memory array 110 and a variety of other peripheral computer system components through an integrated bridge logic device 120. As depicted in FIG. 3, the bridge logic 120 is referred to as a "North bridge" because of its location in the system drawing. The CPU 102 preferably couples to the North bridge logic 120 via a CPU bus 128. Alternatively, the North bridge logic 120 may be integrated into the CPU 102.

The CPU 102 may comprise any suitable microprocessor, such as the Pentium® II or Pentium® Pro microprocessors manufacturer by Intel. It should be understood, however, that other microprocessor configurations could be employed as well. For example, computer system 100 may include multiple CPUs, with each CPU coupled via the CPU bus 128 to the North bridge logic unit 120. The CPU 102 preferably includes a general purpose register set 106 and a non-general purpose register set 108. The non-general purpose register set 108 may include the CPU's memory type range registers (MTRR) or other non-general purpose registers that can be configured for use in accordance with the principles below. Further, the non-general purpose registers can be provided apart from the CPU.

In accordance with the preferred embodiment of the invention, the MTRR register set 108 is used as the storage medium for simulating a memory stack and the general purpose register set 106 is used to facilitate implementing the simulated memory stack. By simulating a memory stack, computer system 100 advantageously permits subroutine return addresses and other types of data to be pushed onto the simulated stack and popped off the stack as desired. A simulated memory stack is particularly useful for solving the problems noted above, particularly in a stackless environment, but can be used if desired even when the system memory 110 is available. The use of the general purpose and MTRR registers sets 106 and 108 to implement the simulated memory stack will be explained below.

The main system memory array 110 preferably couples to the North bridge logic unit 120 through a memory bus 118. The North bridge logic 120 preferably includes a memory control unit 122 that controls transactions to the system memory 110 by asserting the necessary control signals during memory accesses. The system memory 110 functions as the working memory for the CPU 102 and generally includes a conventional memory device or array of memory devices in which application programs and data are stored. The system memory array may comprise any suitable type of memory such as dynamic random access memory ("DRAM"), synchronous dynamic random access memory ("SDRAM"), or extended data out dynamic random access memory ("EDO DRAM").

Referring still to FIG. 3, the computer system 100 also preferably includes a graphics accelerator 140 that couples to the North bridge logic 120 via the graphics bus 148 graphics bus 148 may comprise an advance graphics port ("AGP") bus or other suitable bus architecture. As one skilled in the art will understand the graphics accelerator 140 controls the rendering of text and images on the display device 142. The graphics accelerator 140 may embody a typical graphics accelerator generally known in the art to render three-dimensional data structures on the display 142. These data structures can be effectively shifted into and out of system memory 110 via the graphics bus 148 and North bridge logic 120. The graphics accelerator therefore may be a master of the graphics bus 148 enabling the graphics accelerator 140 to request and receive access to a target interface within the bridge logic unit 120 including the memory control unit 122. This mastership capability permits the graphics accelerator 140 to access system memory 110 without the assistance of the CPU 102. A dedicated graphics bus accommodates rapid retrieval of data from system memory 110. The display 140 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other suitable type of display device for a computer system.

The North bridge logic 120 also includes an interface to a peripheral component Interconnect ("PCI") bus 138, although other bus architectures besides PCI could be used as well. In the preferred embodiment of the invention, one or more PCI peripheral devices 130 reside on the PCI bus 138. The PCI devices 130 may include any of a variety of peripheral devices such as network interface cards ("NIC's"), video accelerators, audio cards, hard or floppy drives, PCMCIA drives, small computer systems interface ("SCSI") adapters and telephony cards. Although only one PCI peripheral device 130 is depicted in FIG. 3, it should be recognized that the computer system 100 may include any number of PCI devices as desired.

Referring still to FIG. 3, a secondary bus bridge device 150 also preferably connects to the PCI bus 138. Bus bridge device 150 is referred to as a "South bridge" because of its location in the drawing. South bridge 150 bridges the PCI bus 138 to at least one other secondary expansion bus 158. Such other secondary expansion busses may include an industry standard architecture ("ISA") bus, a sub-EISA bus, an enhanced industry standard architecture ("EISA") bus, a universal serial bus ("USB"), an integrated drive electronics ("IDE") bus, an IEEE 1394 standard bus ("fire wire"), or any of a variety of other busses that are available or may become available in the future. In the preferred embodiment of FIG. 3, the South bridge logic 150 bridges the PCI bus 138 to an ISA bus 158. Various devices may be coupled to ISA bus 158 such as a mobile super input/output ("MSIO") device 170. The MSIO 170 controls the operation of areas input/output devices such as a keyboard 182 and mouse 184. Also, a BIOS ROM 160 containing the POST code may be coupled to the ISA bus 158.

Figure 1:
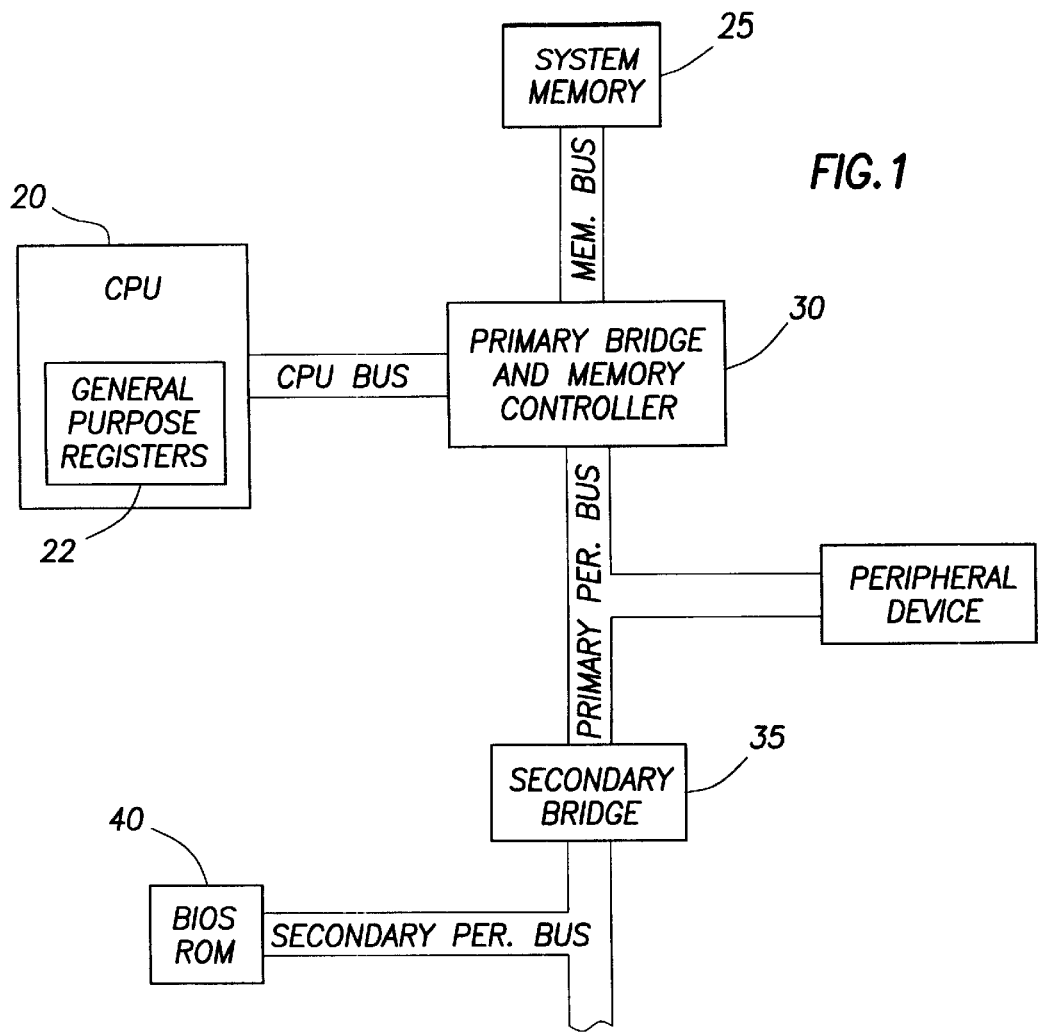
FIG. 1 is a block diagram of a conventional computer system showing a central processing unit (CPU) that includes general purpose registers.
Figure 4:
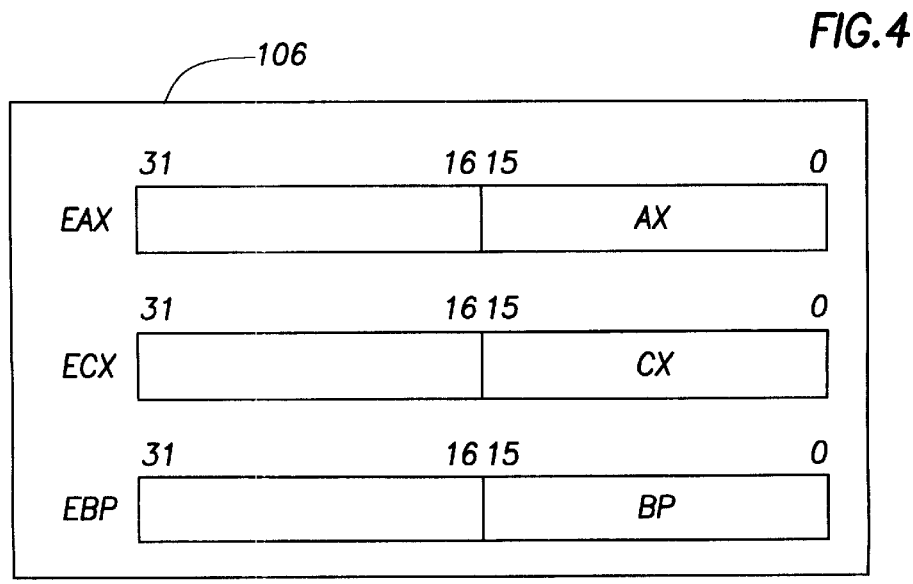
FIG. 4 shows several of the CPU's general purpose registers that are used in accordance with the preferred embodiment to implement the simulated memory stack.
Figure 2:
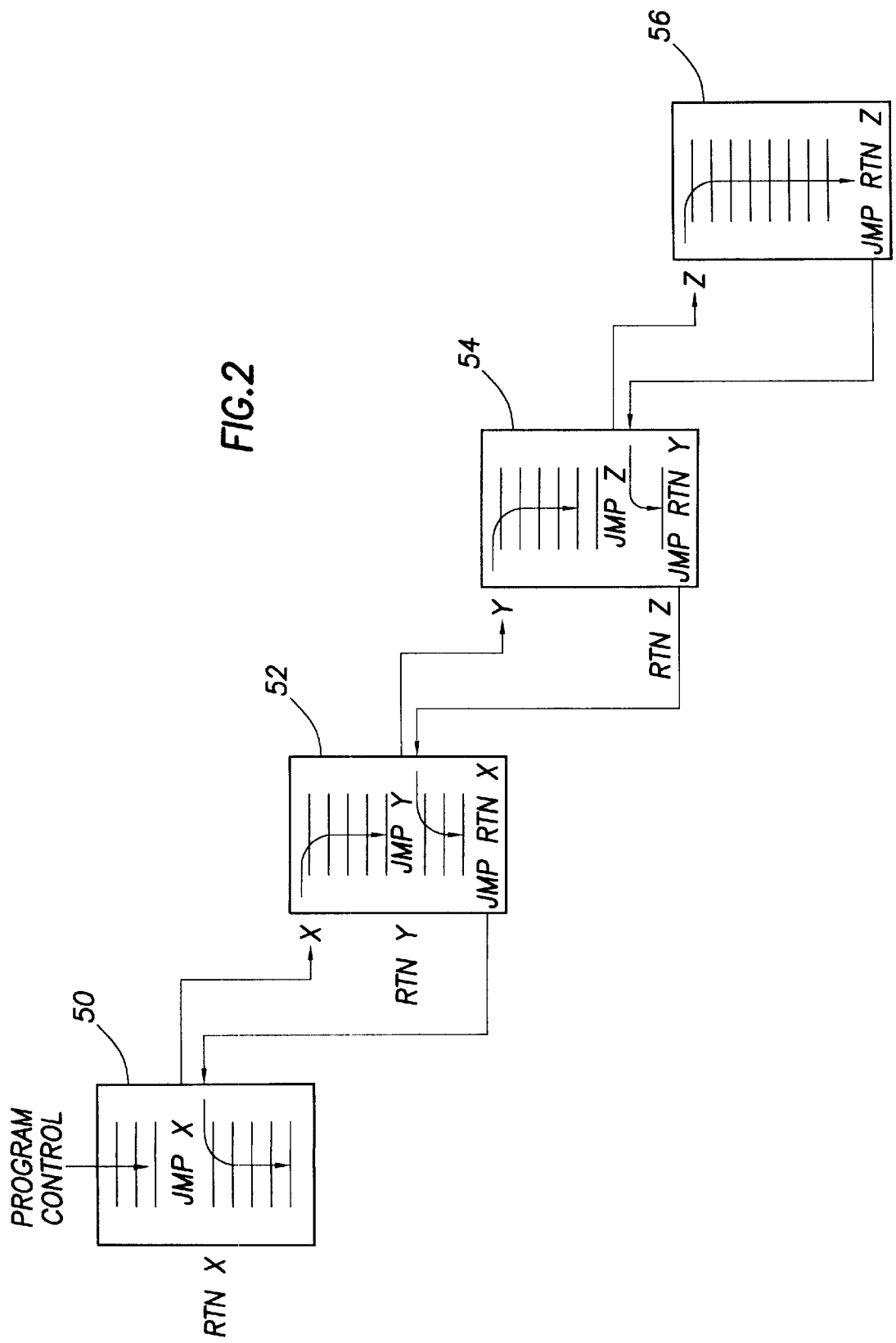
FIG. 2 illustrates nested program execution of multiple subroutines in which return addresses must be stored temporarily.

As noted above, the general purpose register set 106 and MTRR register set 108 are used to simulate a memory stack. The MTRR registers provide the storage locations for the simulated stack and several of the general purpose registers are used to push values onto and pop values off the simulated stack. Referring to FIG. 4, the general purpose registers of a Pentium®-class processor include EAX, ECX and EBP registers, as well as other registers that are not specifically shown (e.g., EBX, EDX, ESI, EDI, ESP). The EAX, ECX and EBP registers are 32 bit registers having bits number from 0 to 31. The lower 16 bit region (bits 0 to 15) of register EAX is referred to as AX. The lower 16 bit region of register ECX is referred to as CX. The lower 16 bit region of register EBP is referred to as BP.

The Pentium II microprocessor includes 11 "fixed" and 16 "variable" range MTRR registers. The following discussion describes the conventional use of the MTRR registers. Fixed-range MTRR's define the rules of conduct within the first megabyte (MB) of memory space. These rules specify how this memory ranges is to be used, specifically with respect to the caching policy. This memory region is subdivided into 88 subregions by the 11 fixed-range MTRR's. The MTRR's define the memory "type" for each of the 88 subregions. The memory type may be one of the following five types which are well-known in the art:
 00h: uncacheable
 01h: write-combining
 04h: write-through
 05h: write-protected
 06h: write-back.

The variable-range MTRR's are provided to specify the cache policy type (including uncacheable) for user specified regions of memory greater than the first MB. Sixteen MTRR's are implemented in eight pairs where each register pair includes an MTRR base register and an MTRR mask register. In the conventional use of the variable-range MTRR registers, the base register specifies the base address of the memory region whose memory type is defined by other bits in the base register. The size of the memory regions so defined is specified in an associated mask register which also includes an enable bit. The enable bit specifies whether the register pair contains valid information.

The computer system 100 of the preferred embodiment uses the fixed and variable-range MTRR registers in the conventional manner described above after the computer has initialized. The computer system 100, however, uses the variable-range MTRR registers in a non-conventional manner as described below during initialization when system memory 110 is unavailable. As will be seen, the variable-range MTRR registers are used as storage locations for the simulated memory stack.

Referring to FIG. 5, the MTRR register set 108 includes, as noted above, 16 variable-range MTRR registers as shown. Eight of the MTRR registers are base registers and eight are mask registers. The base and mask registers generally are used substantially identically to simulate the memory stack and thus, the distinction between "base" and "mask" registers is not maintained for the remainder of this disclosure, except where specifically noted. It should also be noted that other embodiments of the invention may use a subset of the registers shown in FIG. 5 (i.e., not all of the MTRR registers shown in FIG. 5 need be used to simulate a memory stack as explained below).

Each MTRR register is assigned a unique address that begins with 200 for the first variable-range MTRR register and ends with 215 for the sixteenth variable-range MTRR register. For simplicity, the fixed-range MTRR registers have been omitted from the MTRR register set depicted in FIG. 5. Throughout the remainder of this disclosure the variable-range MTRR registers will be referred to simply as "MTRR registers" with the understanding that these registers are variable-range MTRR registers.

Referring still to FIG. 5, the MTRR register at address 200 is referred to as the MTRR stack pointer register (MTRR_SP_REG) and contains a value that represents a pointer to the top of the simulated stack. Alternatively, any other of the MTRR registers could be used as the stack pointer register. The pointer value stored in the MTRR_SP_REG register 200 preferably is an index to one of the other 15 MTRR registers (201–215). The pointer index is an offset value relative to the address (200) of the MTRR_SP_REG register. For example, if MTRR register 211 contains a value that is at the top of the stack, the index value stored in the MTRR_SP_REG register will be 11. The top of stack MTRR register (register 211 in this example) thus is calculated by adding the index offset in the MTRR_SP_REG register to the base address 200 of the MTRR_SP_REG.

FIGS. 6A and 6B show the bit assignments for each bit in the MTRR registers. The MTRR registers in the Pentium® II microprocessor are implemented in pairs as discussed above. The variable MTRR base register bit assignment is shown in FIG. 6A, and the variable MTRR mask register bit assignment is shown in FIG. 6B. Referring first to FIG. 6A, bits 12–35 in the variable MTRR base register preferably are used to store any desired value such as data and subroutine return addresses. Bits 0–7 contain the type of caching policy when the MTRR variable registers are used after initialization in their conventional manner. During initialization, however, bits 0–7 preferably are programmed with a value of 00h to indicate a caching policy type of "uncacheable." Bits 8–11 and 36–63 are shown in cross-hatching to indicate that these bits preferably are unused.

Referring now to FIG. 6B, bits 12–35 preferably also are used to store values such as data and return addresses. Bit 11 (the "V" bit) is the MTRR register enable bit and preferably is cleared (i.e., logic 0) to prevent the CPU 102 from interpreting the values stored in bits 12–35 of the MTRR register pair as valid memory addresses and cache policy types. Clearing the V bit thus permits the MTRR variable-range registers to be used as additional general purpose registers to simulate a memory stack useful for storing any desired values in the data fields (bits 12–35). Using the MTRR registers to simulate a memory stack frees the CPU's actual general purpose registers 108 for any desired use.

The preferred embodiment of the invention includes software to implement the MTRR registers 108 as a simulated memory stack. An exemplary source code listing for the software is attached to the end of this disclosure immediately before the claims. This software preferably is implemented as part of the BIOS code programmed into BIOS ROM 160 (FIG. 3). The source code generally includes four subroutines, referred to as "procedures" in the source code listing. These procedures include SCALL_s, SRET_s, SPUSH_s, and SPOP_s.

The SCALL_s procedure is executed when a first routine "calls" (i.e., jumps to) a second routine. The return address associated with the first routine must be saved temporarily. SCALL_s generally executes a call operation and uses the MTRR-based simulated memory stack to store the return address. The second routine executes the SRET_s procedure upon completion. SRET_s retrieves the return address stored on the simulated memory stack and jumps to that address where the CPU 102 continues program execution.

The SPUSH_s and SPOP_s procedures permit data to be pushed onto and popped off of the simulated memory stack. SPUSH_s places the data value on the top of the MTRR-based simulated memory stack. SPOP_s is a complementary procedure that retrieves whatever data value is stored on the top of the simulated memory stack.

Figure 7:
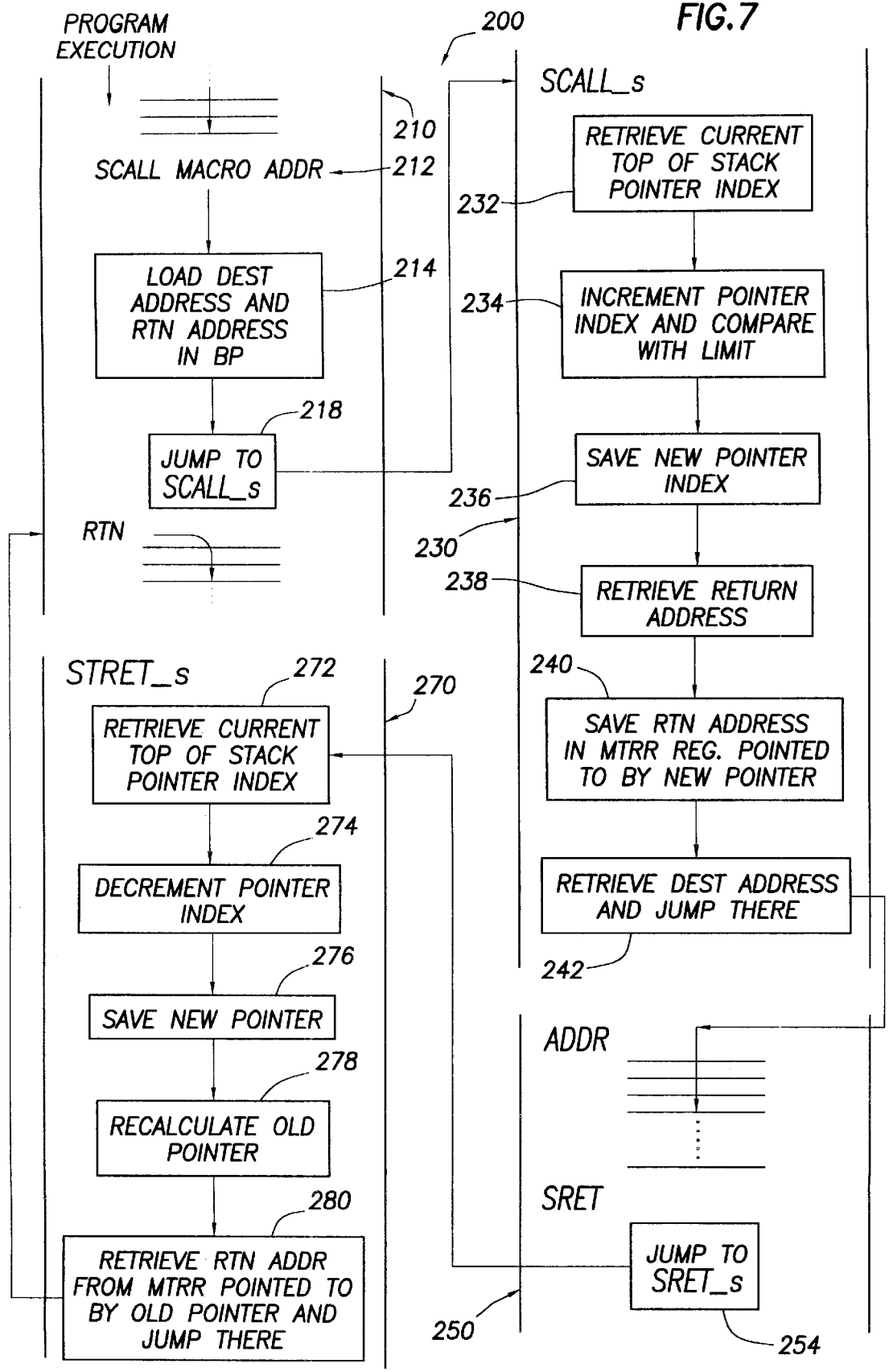
FIG. 7 is a flow chart of "call" and "return" procedures that use the MTRR's as the simulated memory stack.
Figure 8:
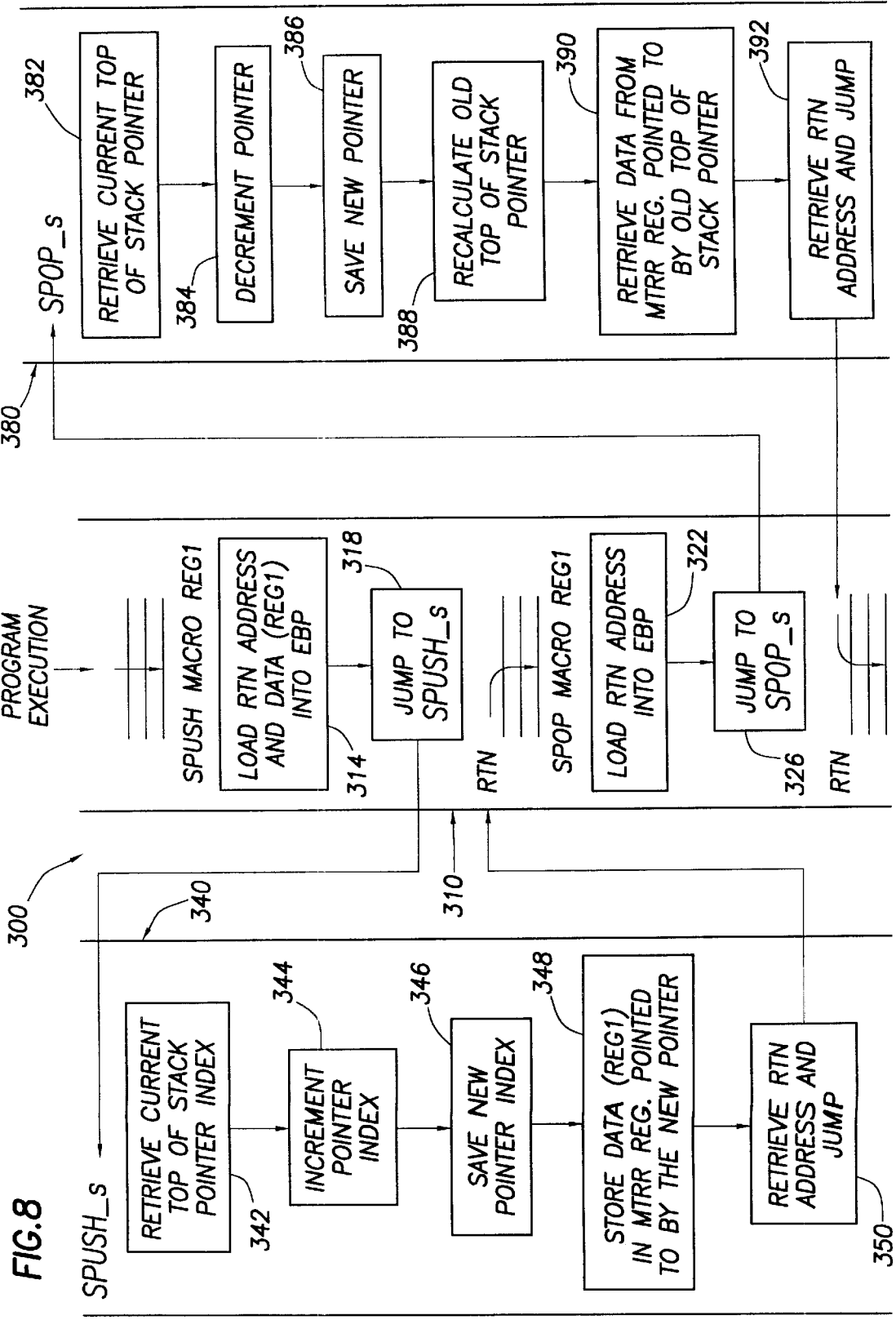
FIG. 8 is a flow chart of "push" and "pop" procedures that use the MTRR's as the simulated memory stack.

The source listing includes comments that are identified by a preceding semicolon. The comments are not part of the executable source, but indicate the function of various portions of code. The operation of the source code will be described with respect to the flow charts 200 and 300 shown in FIGS. 7 and 8, respectively. The flow chart of FIG. 7 illustrates how SCALL_s and SRET_s function, and the flow chart of FIG. 8 illustrates how SPUSH_s and SPOP_s function. These flow charts will be discussed with reference to the sections of code from the source code listing that generally perform each step in the flowcharts.

Referring to FIG. 7, four sections of code 210, 230, 250, and 270 are shown. Generally; code section 210 includes executable instructions that may comprise a portion of a BIOS routine. Code section 210 generally calls a subroutine that begins at destination address, ADDR, which is in code section 250. Before jumping to the destination routine, the CPU 102 executes the SCALL_s procedure in code section 230 to place the return address, RTN, on the simulated memory stack. After the destination subroutine completes, the SRET_s return procedure is executed in code section 270 to retrieve the return address, RTN, from the simulated memory stack and control passes back to code section 210 at address RTN.

Beginning with code section 210, the CPU 102 executes code section 210 until the instruction at point 212 is reached. That instruction is SCALL MACRO ADDR which is a macro included in the source code listing below. That macro is reproduced below:

```
SCALL MACRO ADDR        ;CALL local SUBROUTINE
    LOCAL  RETN         ;Declare Local Variables.
    mov    bp,ADDR      ;Get destination address in BP.
    shl    ebp,16       ;Store it in upper 16 bits of EBP.
    mov    bp,RETN      ;Get return address in BP.
    jmp    SCALL_s      ;Jump to MTRR stack procedure.
RETN:
    ENDM
```

The macro instructions listed above are inserted into the code section 210 at point 212 when the code section 210 is compiled. In step 214, this macro loads the destination address, ADDR, and the return address, RTN, in the BP register shown in FIG. 4. Then, in step 218, the CPU jumps control to the SCALL_s procedure in code section 230.

SCALL_s begins with step 232 in which the current top of stack pointer index value is retrieved from register MTRR_SP_REG (FIG. 5) by executing the following instructions:

MOV ECX,MTRR_SP_REG

RDMSR

The index is incremented in step 234 to calculate a new top of stack pointer index. In accordance with the preferred embodiment, the CPU 102 includes 15 variable-range MTRR registers (other embodiments may include a different number of variable-range MTRR registers), besides the stack pointer register MTRR_SP_REG, for simulating the memory stack. Accordingly, newly incremented top of stack pointer index is compared to a predetermined limit value to verify that the stack limit has not been exceeded. If it has been exceeded, an error condition will be indicated. The incrementing and comparison steps are performed with the following instructions:

ADD EAX, 1000h

CMP EAX,MTRR_STACK_LIM

JA @f

The new pointer index value is saved in the MTRR_SP_REG in step 236 with the following instruction:

WRMSR

Next, the return address is retrieved in step 238 and saved in the MTRR register identified by the new top of stack pointer in step 240. The following instructions performs these functions:

SHR EAX,12

ADD CX,AX

MOV EAX,0

MOV AX,BP

SHL EAX,12

WRMSR

In step 242 the destination address, ADDR, is retrieved and program control jumps to the destination address:

```
SHR    EBP,16        ; Get address of called procedure.
JMP    BP            ; Jump to called procedure.
```

The CPU 102 executes the subroutine in code section 250 until the SRET macro is invoked. The SRET macro is provided by the following instructions:

```
SRET MACRO
    JMP SRET_s   ;Unconditional Jump to stack-less return proc.
    ENDM
```

This macro includes a JMP instruction which invokes the stackless return procedure SRET_s in code section 270.

SRET_s begins with steps 272 and 274 in which the current top of stack pointer index is retrieved from the MTRR_SP_REG (step 272) and decremented (step 274). These steps are performed with the following instructions which also check the new top of stack pointer index for a stack limit error. Decrementing the top of stack index adjusts the simulated memory stack for the subsequent retrieval of the return address stored on top of the simulated stack (step 280).

```
MOV  ECX,MTRR_SP_REG
RDMSR                    ;Get Index from MTRR index reg.
SUB  EAX,1000h           ; Decrement it.
CMP  EAX,0               ; Check for Stack Limit Error.
JB   @f                  ; Y: Output error to port 84 & 85
```

In step 276, the newly decremented pointer index is saved with the following write instruction:

WRMSR; Write it back. In step 278, the old top of stack pointer index is recalculated by executing the instructions:

```
ADD  EAX,1000h           ; Restore current index.
SHR  EAX,12              ; Get index into position.
ADD  CX,AX               ; Add index to base reg.
```

Finally, the return address is retrieved from the simulated memory stack and program control passes to the return address in code section 210. The following instructions perform that function.

```
RDMSR                ; Read it
SHR   EAX,12         ; Get Return address in EAX bits [15:0]
JMP   AX             ; Jump to it.
```

Referring now to FIG. 8, a software flow chart 300 is shown for executing push and pop procedures to the simulated memory stack. Code section 310 illustrates the use of the simulated memory stack of the preferred embodiment to push a data value on the stack and then pop the data value off the stack. In general, the SPUSH_s procedure stores the data value on the simulated stack and returns program control to the address following the jump to SPUSH_s (step 318). When code section 310 needs to retrieve the data value stored on the simulated stack, code section 310 performs steps 322 and 326 to execute SPOP_s which retrieves the data value and returns program control to the address following step 326. The following description describes this process in greater detail.

The CPU 102 executes code section 310 until reaching the SPUSH macro which includes:

```
SPUSH  MACRO  REG1      ; PUSH word value on register stack.
       LOCAL  RETN
       mov    bp,RETN   ; Get return address in BP.
       shl    ebp,16    ; Store it in upper 16 bits of EBP.
       mov    bp,REG1   ; Get data to be pushed in BP.
       jmp    SPUSH_s   ; Jump to MTRR stack procedure.
RETN:
       ENDM
```

The SPUSH macro loads the return address, RETN, and the data to be pushed onto the simulated stack, REG1, into the EBP register as is described in step 314. Then, in step 318, the SPUSH macro jumps to the SPUSH_s procedure in code section 340.

The first step (step 342) in the SPUSH_s procedure is to retrieve the current top of stack pointer index value from the MTRR_SP_REG, which is accomplished by the following instructions:

```
MOV  ECX,MTRR_SP_REG   ; Get current index from
                         base MTRR reg.
RDMSR
```

The pointer index then is incremented in step 344 and saved in the MTRR_SP_REG in step 346 with the following instructions, which also include checking the newly incremented index value for a limit error:

```
ADD    EAX,1000h            ; Increment index.
CMP    EAX,MTRR_STACK_LIM   ; Check for Stack Limit Error.
JA     @f
WRMSR                       ; Write it back.
```

In step 348, the CPU 102 places the data to be pushed onto the simulated stack in the MTRR register that currently resides at the top of the stack. The instructions to perform step 348 preferably include:

```
SHR    EAX,12   ; Move index to lower nibble of EAX.
ADD    CX,AX    ; Add New Index to base.
MOV    AX,BP    ;Save data in BP ==> MTRR register
SHL    EAX,12
WRMSR
```

Finally, in step 350, the CPU 102 retrieves the return address and jumps to that address, which is resides in code section 310, to continue program execution. The instructions to perform step 350 preferably include:

```
SHR    EBP,16   ; Get return address
JMP    BP       ; Return to instruction after PUSH.
```

The CPU 102 continues execution of the instructions in code section 310 until encountering the SPOP macro which includes the following instructions:

```
SPOP   MACRO  REG1      ;Restore word value from register
       LOCAL  RETN
       mov    bp,RETN   ; Get return address in BP.
       shl    ebp,16    ; Store it in upper 16 bits of EBP.
       jmp    SPOP_s    ; jump to SPOP_s.
RETN:
       shr    ebp,16
       mov    REG1,BP
       ENDM
```

The SPOP macro instructions generally load the return address, RETN, into the EBP register and jumps program control to the SPOP_s procedure. As noted above, SPOP_s generally retrieves the data value from the top of the simulated stack. In step 382, the current top of stack pointer 20 index value is retrieved and, in step 384, the index value is decremented to adjust the pointer to identify the MTRR register that contains the new top of stack data value. The decremented index value is also checked for a limit error. Steps 382 and 384 are performed preferably with the following instructions:

```
MOV ECX,MTRR_SP_REG  ; Get current index from base MTRR reg.
RDMSR
SUB    EAX,1000h     ;Decrement index
CMP    EAX,0         ;Check for Stack Limit Error.
JB     @f            ;Y: Output error to port 84 & 85
```

The newly decremented index value is saved in step 386 with the following instruction:
   WRMSR; Write it back.
Then, in step 388 the previous index value, the value before being decremented, is recalculated with the following instructions:

```
ADD    EAX,1000h   ;Restore previous index.
SHR    EAX,12      ;Move index to lower nibble of EAX.
ADD    CX,AX       ; Add New Index to base.
```

The CPU 102 retrieves the data value from the previous top of stack MTRR register (step 390), retrieves the return address, RETN, and jumps to that address (step 392) by executing the following instructions:

```
RDMSR             ; Read it.
SHR    EAX,12     ; Get word value from MTRR register.
MOV    BP,AX      ; Put it back in BP register.
ROL    EBP,16     ; Put return address in BP.
JMP    BP         ; Return after SPOP instruction.
```

Thus, the preferred embodiment of the invention provides a simulated memory stack while the computer is in a stackless environment. Non-general purpose registers are used to simulate a memory stack, thereby alleviating the operational burden placed on the general purpose registers in conventional systems. Further, it should be recognized that, if desired, the preferred embodiments also could be implemented even when the system memory 110 is available. The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

```
;SIMULATED CALL STACK: CODE LISTING
;Copyright 1998 Compaq Computer Corporation
;Robert Volentine, Rahul Patel
;    The code macros and procedures below are used in the
;    implementation of a simulated call stack.
     .XLIST
SCALL  MACRO    ADDR        ; CALL local SUBROUTINE
       LOCAL    RETN        ; Declare Local Variables.
       mov      bp,ADDR     ; Get destination address in BP.
       shl      ebp,16      ; Store it in upper 16 bits of EBP.
       mov      bp,RETN     ; Get return address in BP.
       jmp      SCALL_s     ; Jump to MTRR stack proc.
RETN:
       ENDM
SRET   MACRO
       JMP      SRET_s      ;Unconditional Jump to stack-less
                            return proc.
       ENDM
SPUSH  MACRO    REG1        ; PUSH word value on register stack.
       LOCAL    RETN        ; stack.
       mov      bp,RETN     ; Get return address in BP.
       shl      ebp,16      ; Store it in upper 16 bits of EBP.
       mov      bp,REG1     ; Get data to be pushed in BP.
       jmp      SPUSH_s     ; Jump to MTRR stack proc.
RETN:
       ENDM
SPOP   MACRO    REG1        ; Restore word value from register
       LOCAL    RETN        ; stack.
       mov      bp,RETN     ; Get return address in BP.
       shl      ebp,16      , Store it in upper 16 bits of EBP.
       jmp      SPOP_s      ; POP the data item from
                            the MTRR stack.
RETN:
       shr      ebp,16
       mov      REG1,BP
       ENDM
;************************************************************
;    SCALL_s - This is a procedure to execute a CALL operation and
;    uses the MTRR register stack to store the return address.
;    Entry: Nothing.
;    Exit:
;    Changes: EAX,ECX,EDX and EBP.
;************************************************************
SCALL_s   proc    near
       MOV     ECX,              ; Get current index from
               MTRR_SP_REG       base MTRR reg.
       RDMSR
       ADD     EAX,1000h         ; Increment to next index.
       CMP     EAX,             ; Check for Stack Limit Error.
               MTRR_STACK_LIM
       JA      @f                ; Y: Output error to port 84 & 85
       WRMSR                     ; write it back
       SHR     EAX,12            ; Move index to lower
                                 nibble of EAX.
       ADD     CX,AX             ; Add New Index to base.
       MOV     EAX,0
       MOV     AX,BP
       SHL     EAX,12            ; MTRR register = 200 +
                                 New index.
       WRMSR                     ;Write return addr to top of
                                 simulated stack
       SHR     EBP,16            ; Get address of called procedure.
       JMP     BP                ; Jump to called procedure.
@@:
       MOV     DX,84H            ; Indicate Stack Error.
```

```
       MOV     AL,77h
       OUT     DX,AL
       MOV     DX,85H            ; Indicate SCALL error.
       MOV     AL,01h
       OUT     DX,AL
       JMP     $                 ;Stop on error.
SCALL_s   endp
;************************************************************
;    SRET - This is a procedure to execute a return operation using
;    a stored return address from the MTRR register stack.
;    Entry: Nothing.
;    Exit:
;    Changes: EAX,ECX and EDX.
;************************************************************
SRET_s   proc    near
       MOV     ECX              ; Get Index from MTRR index reg.
               MTRR_SP_REG
       RDMSR
       SUB     EAX,1000h        ; Decrement it.
       CMP     EAX,0            ; Check for Stack Limit Error.
       JB      @f               ; Y: Output error to port 84 & 85
       WRMSR                    ; Write it back.
       ADD     EAX,1000h        ; Restore current index.
       SHR     EAX,12           ; Get index into position.
       ADD     CX,AX            ; Add index to base reg.
       RDMSR                    ; Read it.
       SHR     EAX,12           ; Get Return address in [15:0]
       JMP     AX               ; Jump to it.
@@:
       MOV     DX,84H            ; Indicate Stack Error.
       MOV     AL,77h
       OUT     DX,AL
       MOV     DX,85H            ; Indicate SCALL error.
       MOV     AL,02h
       OUT     DX,AL
       JMP     $                 ; Stop on error.
SRET_s    endp
;************************************************************
;    SPUSH_s - This is a procedure to push a 16 bit data item onto the
;    MTRR register stack.
;    Entry: Nothing.
;    Exit:
;    Changes: EAX,ECX,EDX and EBP.
;************************************************************
SPUSH_s   proc    near
       MOV     ECX,              ; Get current index
               MTRR13 SP_REG     from base MTRR reg.
       RDMSR
       ADD     EAX,1000h         ; increment to next index.
       CMP     EAX,             ; Check for Stack Limit Error.
               MTRR_STACK_LIM
       JA      @f                ; Y: Output error to port 84 & 85
       WRMSR                     ;N: Update MTRR Stack Pointer.
       SHR     EAX,12            ; Move index to lower
                                 nibble of EAX.
       ADD     CX,AX             ; Add New Index to base.
       MOV     AX,BP             ; Save data in BP ==> MTRR register
       SHL     EAX,12
       WRMSR
       SHR     EBP,16            ; Get return address
       JMP     BP                ; Return to instruction after PUSH.
@@:
       MOV     DX,84H            ; Indicate Stack Error.
       MOV     AL,77h
       OUT     DX,AL
       MOV     DX,85H            ; Indicate SCALL error.
       MOV     AL,03h
       OUT     DX,AL
       JMP     $                 ; Stop on error.
SPUSH_s   endp
;************************************************************
;    SPOP_s - This is a procedure to restore a 16 bit data item from the
;    MTRR register stack.
;    Entry: Nothing.
;    Exit:
;    Changes: EAX,ECX,EDX and EBP.
;************************************************************
SPOP_s   proc    near
       MOV     ECX,              ; Get current index
```

-continued

```
MTRR_SP_REG            from base MTRR reg.
RDMSR
SUB       EAX,1000h    ; Decrement index.
CMP       EAX,0        ; Check for Stack Limit Error.
JB        @f           ; Y: Output error to port 84 & 85
WRMSR                  ; write it back.
ADD       EAX,1000h    ; Restore previous index.
SHR       EAX,12       ; Move index to lower
                         nibble of EAX.
ADD       CX,AX        ; Add New Index to base.
RDMSR                  ; Read it.
SHR       EAX, 12      ; Get word
                         value from MTRR register.
MOV       BP,AX        ; Put it back in BP register.
ROL       EBP,16       ; Put return address bac in BP.
JMP       BP           ; Return after SPOP instruction.
@@:
MOV       DX,84H       ; Indicate Stack Error.
MOV       AL,77h
OUT       DX,AL
MOV       DX,85H       ; Indicate SCALL error.
MOV       AL,04h
OUT       DX,AL
JMP       $            ; Stop on error.
SPOP_s    endp
```

What is claimed is:

1. A method for performing a subroutine call and return using a simulated memory stack, comprising:
    (a) loading a destination address corresponding to the subroutine to be called in a CPU general purpose register;
    (b) loading a return address in a CPU general purpose register, the return address corresponding to the instruction to be returned to following execution of the subroutine;
    (c) retrieving a pointer value corresponding to a top of stack pointer for the simulated stack;
    (d) adjusting the pointer value;
    (e) saving the adjusted pointer value from step (d) in a non-general purpose register;
    (f) saving the return address in a non-general purpose register pointed to by the adjusted pointer value from step (d); and
    (g) jumping to the destination address to execute the subroutine.

2. The method of claim 1 wherein the non-general purpose registers used in steps (e) and (f) include memory type range registers included in a CPU.

3. The method of claim 1 wherein step (d) includes incrementing the pointer value.

4. The method of claim 1 wherein step (c) includes:
    (c1) retrieving an index value; and
    (c2) adding the index value to a base register address to compute the pointer value.

5. The method of claim 1 further including:
    (h) executing the subroutine;
    (i) retrieving a pointer value corresponding to the top of stack pointer; and
    (j) retrieving the return address from a non-general purpose register pointed to by the pointer value.

6. The method of claim 5 further including:
    (k) jumping to the return address to continue executing instructions.

7. The method of claim 5 wherein the non-general purpose register used in step (j) includes a CPU memory range type register.

8. The method of claim 5 further including:
    (l) adjusting the pointer value; and
    (m) saving the adjusted pointer value from step (l).

9. The method of claim 8 wherein step (l) includes decrementing the pointer value.

10. A method for pushing data onto a simulated memory stack in a CPU, comprising:
    (a) loading a return address into a CPU general purpose register;
    (b) loading the data into a CPU general purpose register;
    (c) retrieving a stack pointer value from a non-general purpose register, said stack pointer value identifying a non-general purpose register as the top of the simulated memory stack;
    (d) adjusting the pointer value to permit the data to be pushed onto the simulated memory stack; and
    (e) storing the data in a non-general purpose register associated with the pointer value.

11. The method of claim 10 further including:
    (f) saving the adjusted pointer value from step (d) in a non-general purpose register;
    (g) retrieving the return address from the simulated memory stack; and
    (h) jumping to the return address.

12. The method of claim 10 wherein the non-general purpose registers used in steps (c) and (e) include CPU registers.

13. The method of claim 10 wherein the non-general purpose registers used in steps (c) and (e) include CPU memory type range registers.

14. The method of claim 10 wherein step (d) includes incrementing the pointer value.

15. The method of claim 10 wherein step (c) includes:
    (c1) retrieving an index value; and
    (c2) adding the index value to a base register address.

16. A method for popping data from a simulated memory stack in a CPU, comprising:
    (a) retrieving a simulated stack pointer value from a non-general purpose register;
    (b) retrieving data from a non-general purpose register pointed to by the pointer value; and
    (c) adjusting the pointer value.

17. The method of claim 16 wherein step (c) includes decrementing the pointer value.

18. The method of claim 16 wherein step (c) is performed before step (b).

19. The method of claim 18 wherein step (b) includes:
    (b1) recalculating the pointer value retrieved in step (a); and
    (b2) retrieving data from the non-general purpose register pointed to by the pointer value recalculated in step (b1).

20. A computer system, comprising:
    a CPU containing general purpose registers and non-general purpose registers;
    a display coupled to said CPU;
    a peripheral device coupled to said CPU; and
    a non-volatile memory coupled to said CPU, said non-volatile memory containing executable instructions for simulating a memory stack in said CPU's non-general purpose registers.

21. The computer system of claim 20 wherein the non-general purpose registers include memory type range registers.

22. The computer system of claim 20 wherein one of the non-general purpose registers contains a pointer value indicative of the top of the simulated memory stack.

23. The computer system of claim 22 wherein the executable instructions include instructions that retrieve the pointer value.

24. The computer system of claim 23 wherein the executable instructions further include instructions to adjust the pointer value to permit a value to be stored on or retrieved from the simulated memory stack.

25. The computer system of claim 20 wherein the executable instructions include a set of instructions for simulating a call instruction used for calling a subroutine and for simulating a return instruction for returning from the subroutine, the simulated call instructions include loading a destination address of the subroutine and a return address in a general purpose register.

26. The computer system of claim 25 wherein the executable instructions further include instructions for retrieving a pointer value, the pointer value identifying which of the non-general purpose registers is associated with the top of the simulated memory stack.

27. The computer system of claim 26 wherein the executable instructions further include instructions for incrementing the pointer value and saving the return address in the non-general purpose register identified as the top of the simulated memory stack by the incremented pointer value.

28. The computer system of claim 26 wherein the return instructions include instructions for retrieving the return address from the simulated memory stack.

29. The computer system of claim 20 wherein the executable instructions include instructions that simulate a push instruction for storing a data value onto the simulated memory stack and that simulate a pop instruction for retrieving a data value from the simulated memory stack.

30. The computer system of claim 29 wherein the simulated push instructions include retrieving a pointer value which identifies which of the non-general purpose registers is associated with the top of the simulated memory stack.

31. The computer system of claim 30 wherein the simulated push instructions include incrementing the pointer value and storing the data in the non-general purpose register identified as the top of the simulated memory stack by the pointer value.

32. The computer system of claim 31 wherein the simulated pop instructions include an instruction for retrieving the pointer value.

33. The computer system of claim 32 wherein the simulated pop instructions include instructions for reading a data value from the non-general purpose register identified as the top of the simulated memory stack by the pointer value.

34. The computer system of claim 20 wherein said peripheral device is a keyboard.

35. The computer system of claim 20 wherein said peripheral device is a mouse.

36. A computer readable storage medium for storing an executable set of software instructions which, when inserted into a host computer system, said software instructions being operable to simulate a memory stack in a set of non-general purpose CPU registers, said software instructions including:
   means for reading a pointer index value from one of the non-general purpose registers, the pointer index value identifying which of the other non-general purpose registers is associated with the top of the simulated memory stack; and
   means for adjusting the pointer index value.

37. The computer readable storage medium of claim 36 wherein said adjusting means includes a means to increment the pointer index value when a value is to be stored on top of the simulated memory stack.

38. The computer readable storage medium of claim 36 wherein said adjusting means includes a means to decrement the pointer index value wherein a value is to be read from the simulated memory stack.

39. The computer readable storage medium of claim 36 further including a means for storing a return address on the simulated memory stack.

40. The computer readable storage medium of claim 39 further including a means for reading a return address from the simulated memory stack.

41. The computer readable storage medium of claim 36 further including a means for storing a data value on the simulated memory stack.

42. The computer readable storage medium of claim 39 further including a means for reading a data value from the simulated memory stack.

* * * * *